Patented Dec. 6, 1927.

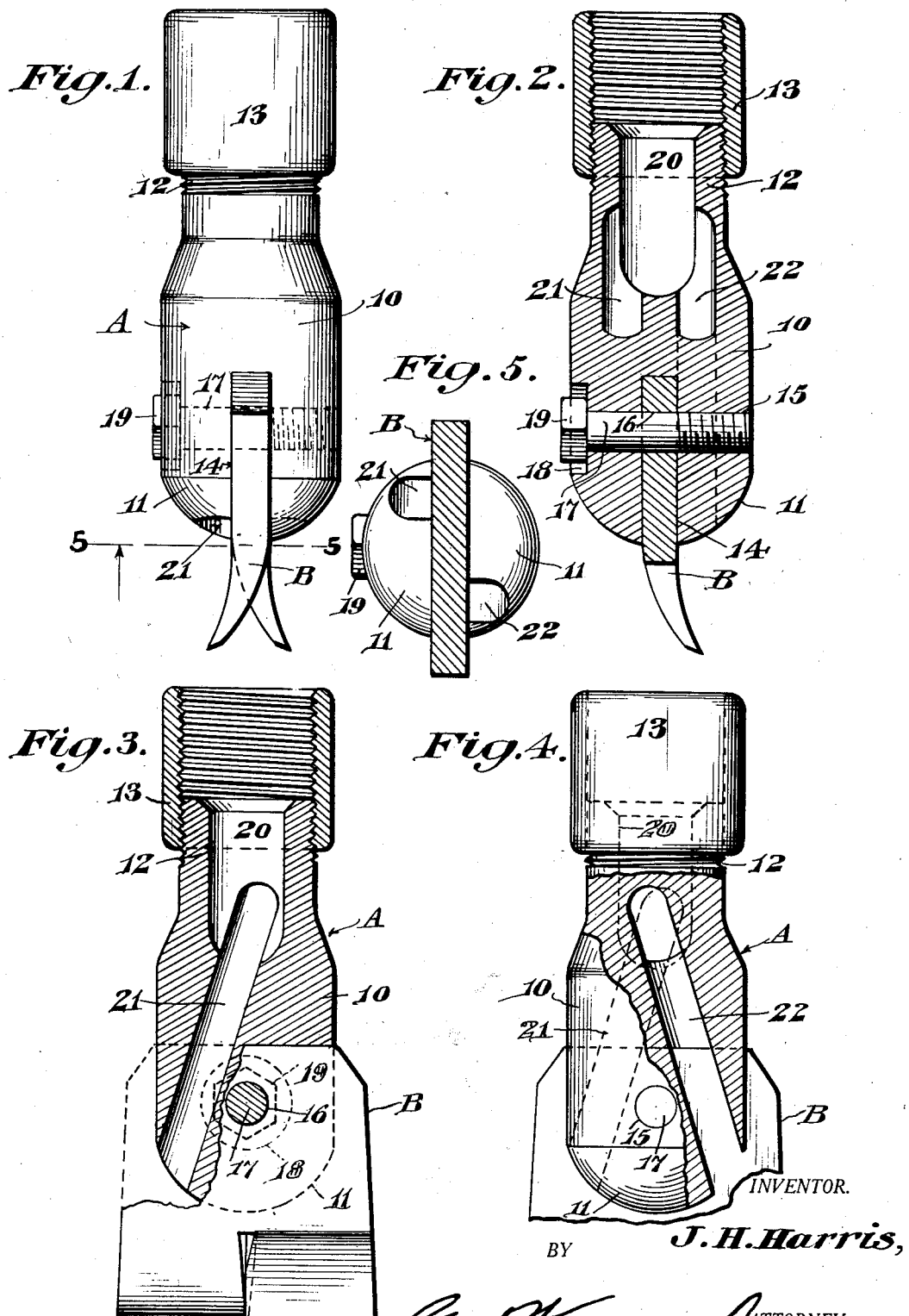

1,652,129

UNITED STATES PATENT OFFICE.

JOHN H. HARRIS, OF SHANNON, MISSISSIPPI.

CHUCK FOR HOLDING BITS.

Application filed March 30, 1927. Serial No. 179,592.

The invention relates to a tool chuck and more particularly to the class of drill bit chucks or heads.

The primary object of the invention is the provision of a chuck of this character, wherein the same is arranged to removably accommodate a bit and the latter when held therein can be subjected to a water supply fed through the chuck for maintaining the bit clean during the boring or drilling operation, the chuck in its make-up being of novel form, so that water can be delivered to both faces of the bit and be directed thereon to the point of engagement of the cutting contact, so as to serve in maintaining the bit clean and also effecting the softening of the material acted upon for the successful operation of the said bit.

Another object of the invention is the provision of a chuck of this character, wherein the bit when mounted therein and the tool in operation will constantly maintain the bit clean as the cuttings will be prevented from adhering to the active faces of the bit and at the same time the cuttings will be driven out of the path of the bit, as the water supply through the chuck may or may not be under pressure and if under pressure will force the cuttings away from the active sides of the bit and cause the same to rise around the chuck, the passages for the water flow being disposed in a particular manner to assure the proper direction of the flow of water relative to the bit during the continued operation of the tool.

A further object of the invention is the provision of a chuck of this character, wherein the same is readily mountable upon a shank or demountable therefrom and will removably support bits of different sizes, shapes and kinds selective for the particular work to be performed in the use of the chuck.

A still further object of the invention is the provision of a chuck of this character, which is extremely simple in construction, thoroughly reliable and efficient in its purposes, strong, durable and inexpensive to manufacture.

With these and other objects in view, the invention consists in the features of construction, combination and arrangement of parts, as will be hereinafter more fully described in detail, illustrated in the accompanying drawing showing the preferred embodiment of the invention and pointed out in the claim hereunto appended.

It is to be understood, however, that changes, variations and modifications may be made in the chuck as come properly within the scope of the claim hereunto appended, without departing from the spirit of the invention or sacrificing any of its advantages.

In the accompanying drawing:—

Figure 1 is an elevation of a chuck constructed in accordance with the invention, showing preferably a conventional type of bit mounted therein.

Figure 2 is a vertical sectional elevation through the chuck and through the bit.

Figure 3 is a view similar to Figure 2, the section being taken at right angles thereto longitudinally through the chuck.

Figure 4 is a side elevation of the chuck and a portion of the bit, the body of the chuck being broken away for illustrating details.

Figure 5 is a sectional view on the line 5—5 of Figure 1 looking in the direction of the arrow.

Similar reference characters indicate corresponding parts throughout the several views in the drawing.

Referring to the drawing in detail, A designates generally the chuck and B the demountable bit, which latter is shown of the fish-tail kind, although any other type of bit can be detachably engaged in the chuck, which constitutes the present invention as will be hereinafter more fully described.

The chuck A comprises a rounded body 10, although said body at its external surface may be of any other contour, the rounded contour being preferable. The outer end of the body 10 is of semi-spherical formation as at 11, although this formation may be varied as the occasion may require, while the inner end portion of said body 10 is reduced to provide a coupling stem or shank 12, the latter being externally threaded to accommodate a correspondingly threaded coupling collar or sleeve 13, this being of conventional type to detachably secure the chuck A to the lower end of a drilling tube not shown.

Formed transversely of the body 10 at the longitudinal median thereof for a distance of the outer end portion and opening through the semi-spherical outer face 11 and the opposite sides of said body 10 is a bit socket or furcation 14, the same being of the required width and depth to accommodate therein the bit B of the blade or fish-tail type. Intersecting the socket or furcation 14 and formed in the body 10 at right angles to said socket or furcation is a bolt passage 15, while formed in the bit B to register with this passage 15 is a suitable hole 16 for accommodating a headed bolt 17, the free end portion of which being in threaded engagement in the body 10 and in this manner the bit is removably secured in the chuck A as will be clearly apparent in Figures 1, 2 and 3 of the drawing.

The outer face of the body 10 of the chuck A has formed therein a countersink 18 next to the head 19 of the bolt 17 so that said head 19 will be countersunk in the body 10 of the chuck as will be obvious.

Formed centrally in the inner end of the body 10 of the chuck A and opening through the coupling stem or extension 12 is a water receiving chamber or water directing bore 20 while opening into diametrically opposite sides of said chamber or bore 20 are the inner end portions of outwardly divergent water passages 21 and 22, respectively, these being disposed at reversed angles to each other and are formed in the body 10 of the chuck A and laterally spaced from each other and extend through said body 10 on opposite sides of the socket or furcation 14 and open laterally thereinto and through the outer end at the semi-spherical face 11 thereof of said body 10 so as to direct independent streams of water onto opposite sides of the bit B and to cause the water to flush the fish-tails constituting the cutting portions of the bit B so as to free these cutting portions of the bit from matter which ordinarily adheres thereto during the boring or drilling operation and at the same time disperses the cuttings of the material acted upon by the bit B so as to drive such cuttings away from the cutting sides of the bit and upwardly about the body 10 of the chuck A when in operation.

In the use of the chuck the water delivered thereinto through the chamber or bore 20 may or may not be under pressure, but preferably will be under pressure so as to give velocity and force to the water when passing through the passages 21 and 22 to drive off any adhering matter on the faces of the bit B at the working portions thereof and to disperse the cuttings of the material by the bit in the path thereof during the operation of the chuck as will be clearly apparent.

From the foregoing it is thought that the construction and manner of operation of the chuck will be clearly understood and therefore a more extended explanation has been omitted.

What is claimed is:—

A chuck of the character described comprising a body portion having an axially arranged, lengthwise extending, transversely disposed furcation opening at the outer end thereof and providing a socket for the reception of a bit, said body portion further having an axially disposed chamber having its bottom wall spaced from the inner wall of the furcation, said chamber permanently open at the inner end of said body portion, said body portion further formed with a pair of spaced, oppositely disposed passages inclining outwardly throughout from their inner to their outer ends, said passages opening at their inner ends into said chamber, each of said passages having the lower portion of its inner side opening through a side wall of the furcation adjacent the vertical median of said wall, and said passages further having their outer ends opening at the outer end of said body portion on each side of the bit.

In testimony whereof, I affix my signature hereto.

JOHN H. HARRIS.